US00RE46089E

(19) United States
(12) Reissued Patent
Brunnmayr

(10) Patent Number: US RE46,089 E
(45) Date of Reissued Patent: Aug. 2, 2016

(54) FURNITURE HINGE

(71) Applicant: Julius Blum GmbH, Hoechst (AT)

(72) Inventor: Harald Brunnmayr, Hoerbranz (AT)

(73) Assignee: JULIUS BLUM GMBH, Hoechst (AT)

(21) Appl. No.: 14/638,516

(22) Filed: Mar. 4, 2015

Related U.S. Patent Documents

Reissue of:
(64) Patent No.: 8,387,213
Issued: Mar. 5, 2013
Appl. No.: 13/205,797
Filed: Aug. 9, 2011

U.S. Applications:
(63) Continuation of application No. PCT/AT2010/000076, filed on Mar. 12, 2010.

(30) Foreign Application Priority Data

Mar. 25, 2009 (AT) ..... A 475/2009

(51) Int. Cl.
*E05D 11/00* (2006.01)
*E05F 5/00* (2006.01)
*E05D 11/08* (2006.01)

(52) U.S. Cl.
CPC ..... *E05F 5/006* (2013.01); *E05D 11/08* (2013.01); *E05Y 2600/46* (2013.01); (Continued)

(58) Field of Classification Search
CPC ..... E05F 5/003; E05D 11/08; E05Y 2600/46; E05Y 2900/20; Y10T 16/54025; Y10T 16/5409; Y10T 16/61; Y10T 16/554; Y10T 16/54
USPC ..... 16/319, 321, 323, 327, 332, 350, 352, 16/362, 364, 82, 83, 84, 85.5, 54
See application file for complete search history.

(56) References Cited

U.S. PATENT DOCUMENTS 3,864,786 A * 2/1975 Salice ..... E05D 3/142 16/278
4,502,182 A * 3/1985 Lautenschlager et al. ..... E05D 5/08 16/288

(Continued)

FOREIGN PATENT DOCUMENTS

AT 9077 2/1902
AT 6499 11/2003

(Continued)

OTHER PUBLICATIONS

Grass "Snap On 3000 Airmatic Hinge" Brochure, 3 pages.

(Continued)

*Primary Examiner* — Patricia Engle
(74) *Attorney, Agent, or Firm* — Wenderoth, Lind & Ponack, L.L.P.

(57) ABSTRACT

A furniture hinge, comprising a fitting part, a hinge cup that is articulated thereto for fastening to furniture parts, and a cushioning apparatus for cushioning a relative movement between the fitting part and the hinge cup, wherein the cushioning apparatus is disposed in or on the hinge cup, wherein the cushioning apparatus comprises a housing having first fastening means, and second fastening means are disposed on the hinge cup, wherein the housing of the cushioning apparatus can be inserted from above into the hinge cup and in the installed position is disposed substantially completely inside the hinge cup, wherein the housing of the cushioning apparatus and hinge cup can be connected to each other in said installed position by the first and second fastening means.

29 Claims, 14 Drawing Sheets

(52) U.S. Cl.

CPC ..... *E05Y 2900/20* (2013.01); *Y10T 16/54* (2015.01); *Y10T 16/5409* (2015.01); *Y10T 16/54025* (2015.01); *Y10T 16/554* (2015.01); *Y10T 16/61* (2015.01)

(56) References Cited

U.S. PATENT DOCUMENTS

| | | | | |
|---|---|---|---|---|
| 5,269,043 | A | 12/1993 | Yang | |
| 5,392,493 | A * | 2/1995 | Youngdale | 16/321 |
| 5,524,323 | A | 6/1996 | Lin | |
| 7,600,295 | B2 | 10/2009 | Zimmer | |
| 7,748,082 | B2 | 7/2010 | Harald et al. | |
| 7,861,376 | B2 | 1/2011 | Fitz et al. | |
| 2002/0046441 | A1 | 4/2002 | Brustle | |
| 2003/0200625 | A1 | 10/2003 | Zimmer | |
| 2004/0093693 | A1 | 5/2004 | Salice | |
| 2004/0103499 | A1 | 6/2004 | Egger et al. | |
| 2004/0107542 | A1 * | 6/2004 | Rock | E05D 5/065 16/387 |
| 2005/0015927 | A1 | 1/2005 | Kropf | |
| 2006/0026792 | A1 | 2/2006 | Brustle et al. | |
| 2007/0136990 | A1 | 6/2007 | Salice | |
| 2007/0220705 | A1 | 9/2007 | Fitz et al. | |
| 2008/0092333 | A1 | 4/2008 | Migli | |
| 2008/0168620 | A1 | 7/2008 | Hammerle | |
| 2009/0049645 | A1 | 2/2009 | Salice | |
| 2009/0119876 | A1 * | 5/2009 | Pecar et al. | 16/85 |
| 2009/0313789 | A1 | 12/2009 | Lautenschlager | |
| 2011/0005032 | A1 | 1/2011 | Domenig et al. | |

FOREIGN PATENT DOCUMENTS

| | | |
|---|---|---|
| CN | 2695572 | 4/2005 |
| CN | 2713099 | 7/2005 |
| CN | 101165303 | 4/2008 |
| CN | 101297093 | 10/2008 |
| DE | 25 39 954 | 1/1977 |
| DE | 92 10 092 | 11/1992 |
| DE | 201 15 250 | 12/2002 |
| DE | 102 11 294 | 9/2003 |
| DE | 102 27 078 | 1/2004 |
| DE | 10 2006 047 315 | 4/2008 |
| DE | 10 2007 047 287 | 11/2008 |
| EP | 1 469 153 | 10/2004 |
| JP | 2002-138746 | 5/2002 |
| JP | 2004-162523 | 6/2004 |
| JP | 2006-526087 | 11/2006 |
| JP | 2008-517227 | 5/2008 |
| JP | 2009-536700 | 10/2009 |
| WO | 2004/020771 | 3/2004 |
| WO | 2004/092516 | 10/2004 |
| WO | 2006/051074 | 5/2006 |
| WO | 2006/053364 | 5/2006 |
| WO | 2007/025316 | 3/2007 |
| WO | 2007/131933 | 11/2007 |
| WO | 2008/104009 | 9/2008 |
| WO | 2008/135155 | 11/2008 |
| WO | 2009/003458 | 1/2009 |
| WO | 2009/094272 | 7/2009 |

OTHER PUBLICATIONS

Wood Digest Internet Article Summary Re "Snap on 3000 Airmatic Hinge", Sep. 2005.

International Search Report issued Jun. 22, 2010 in International (PCT) Application No. PCT/AT2010/000076.

* cited by examiner

Fig. 2
AMENDED
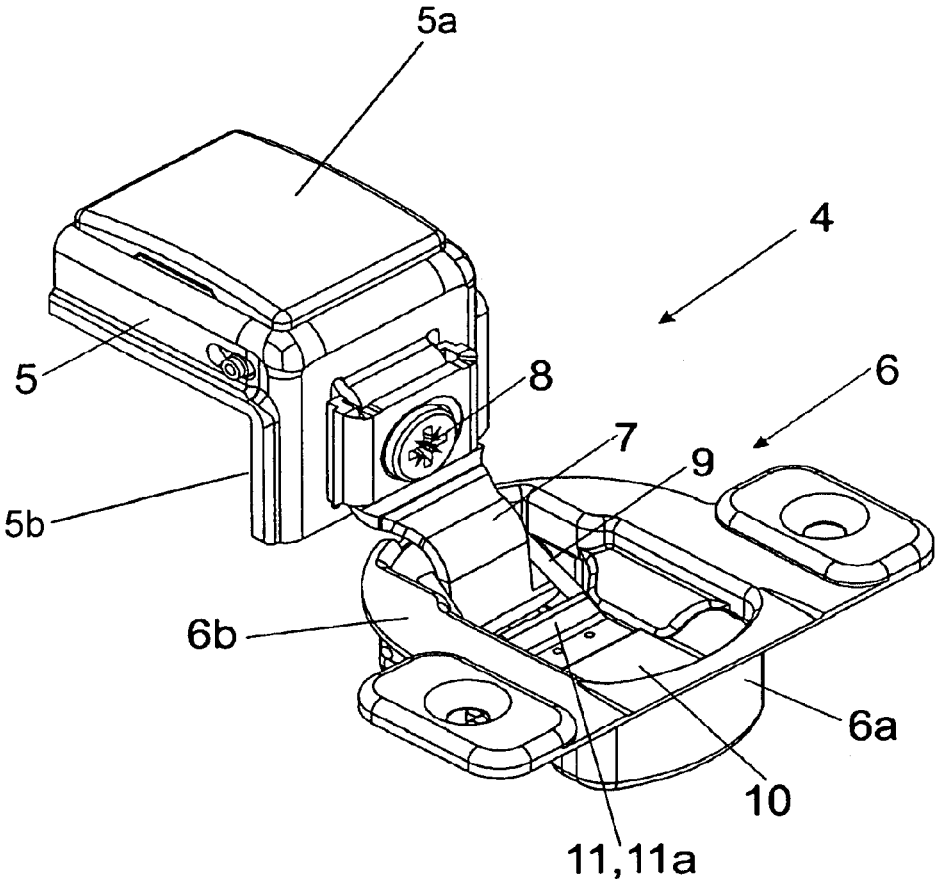

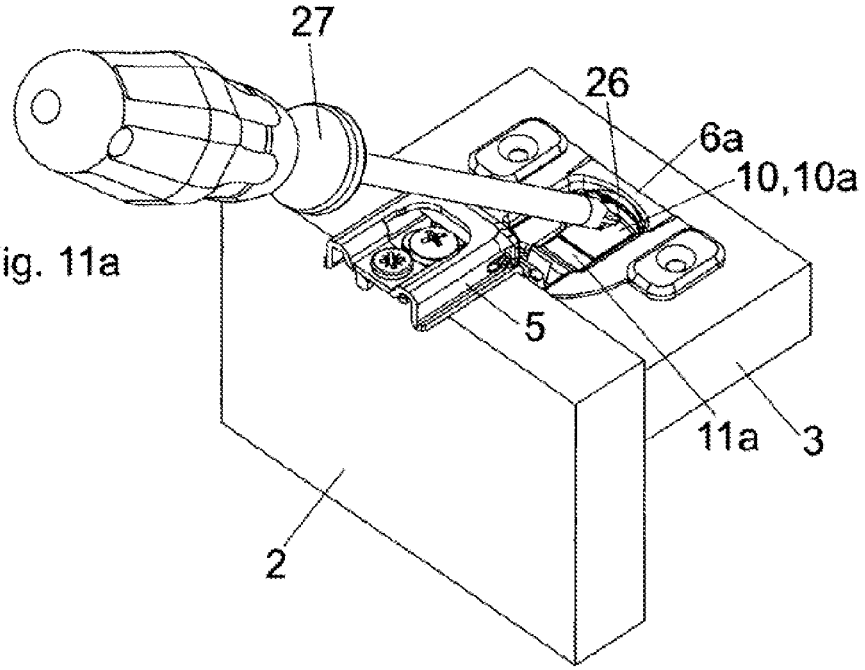
Fig. 11a
Fig. 11b
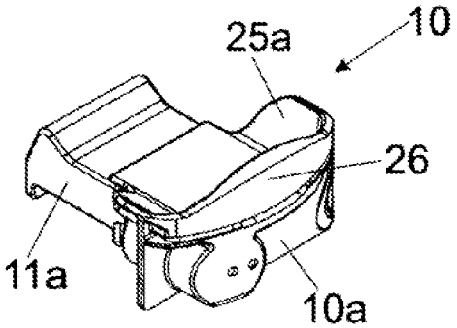
Fig. 11c
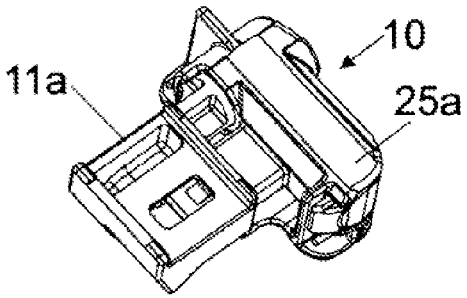
Fig. 11d
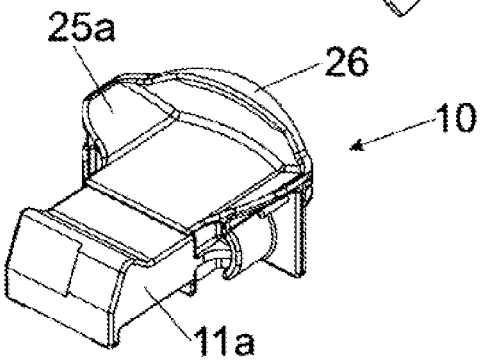

FURNITURE HINGE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*The present application is a reissue application of U.S. Pat. No. 8,387,213, which issued on Mar. 5, 2013 based on application Ser. No. 13/205,797, filed Aug. 9, 2011.*

This application is a Continuation of International application No. PCT/AT2010/000076, filed Mar. 12, 2010, the entire disclosure of which is incorporated herein by reference.

The present invention concerns a furniture hinge comprising a fitment portion and a hinge cup hingedly connected thereto for fixing to furniture parts, and a damping device for damping a relative movement between the fitment portion and the hinge cup, wherein the damping device is arranged in or on the hinge cup.

The invention further concerns an article of furniture having at least one furniture hinge of the kind to be described.

Furniture hinges comprising a hinge cup and a damping device arranged in or on the hinge cup are already known in the state of the art. As an example in that respect mention is to be made at AT 6499 to the present applicant, DE 25 39 954 A1, DE 10 2007 047 287 A1, DE 10 2006 047 315 A1 or EP 1 469 153 A1. Damping devices having a piston which has a linear damping stroke usually have a travel-dependent damping function, that is to say the degree of damping is dependent on the available damping stroke of the piston. Therefore a sufficient damping travel is to be provided to achieve the desired soft cushioning of a relative movement of the two fitment portions. A particular requirement is therefore that of arranging the damping device in as space-saving a fashion as possible, but at the same time also ensuring an adequate damping stroke and thus a satisfactory damping action for the furniture hinge.

WO 2007/131933 A1 discloses a furniture hinge having a damping device, wherein the housing of the damping device is held within the hinge cup by way of co-operating fixing means (in the form of a tab and an abutment surface). As a consequence of a hinge lever of the hinge being connected to a slider of the damping device, the damping device already has to be fitted into and fixed in the hinge cup, as from the factory.

WO 2009/094272 A1 which is of earlier priority but published after the relevant date describes a furniture hinge having a damping device which is fitted into the hinge cup and fixed by way of snap-action holding means relative to the hinge cup bottom. That publication does not show a hinge in which the damping device can be inserted from above into the hinge cup, with the fitment portion and the hinge cup hingedly connected together. For retro-fitting of the damping device it is obviously necessary to dismantle the hinge.

The object of the present invention is to propose a furniture hinge of the general kind referred to in the opening part of this specification, wherein the damping device saves space, is efficient and can be fitted at a later stage.

According to the invention in an advantageous configuration that is achieved in that the damping device has a housing having first fixing means and second fixing means are arranged on the hinge cup, wherein the housing of the damping device can be inserted from above into the hinge cup and in the mounted position is arranged substantially completely within the hinge cup, wherein the housing of the damping device and the hinge cup can be connected together in said mounted position by way of the first and second fixing means.

The definition 'can be inserted from above into the hinge cup' is intended to mean insertion of the housing of the damping device in a direction of movement substantially perpendicular to the bottom of the hinge cup.

It is therefore possible with the proposed invention to arrange the housing of the damping device completely within the hinge cup, wherein the housing in that mounted condition preferably does not project beyond the hinge cup, that is to say the entire component unit of the damping device in the mounted condition is completely between the bottom of the hinge cup and the plane formed by the hinge cup opening. The housing of the damping device can be mounted relative to the hinge cup and removed therefrom by way of the first and second fixing means. In an embodiment of the invention it can be provided that the housing of the damping device can be releasably fixed on or in the hinge cup by the first and the second fixing means, preferably it can be fitted without the use of a tool and can preferably be dismantled without the use of a tool.

The damping device can include a slider movable relative to the housing, wherein the first fixing means are provided on the slider so that the housing of the damping device can be connected to the hinge cup releasably indirectly by way of the slider.

In a preferred embodiment of the invention it can be provided that the first and second fixing means are in the form of a self-latching latching connection. Such a latching connection permits automatic latching between the housing of the damping device and the hinge cup in the course of introducing the housing into the hinge cup without in that case the user having to actuate additional locking means for fixing purposes. The first and second fixing means can together form a snap-action connection so that the damping device can be clipped into the hinge cup in the form of a complete unit. In a possible embodiment of the invention, the first or second fixing means can include at least one movable or mobile arresting element by which the housing can be fixed relative to the hinge cup. A desirable configuration is characterised in that the arresting element is of a resilient nature, wherein the connection between the first and second fixing means is releasable by pressure against the resilient action of the arresting element.

In a possible embodiment it can be provided that the arresting element is arranged on the housing of the damping device and in the mounted position engages into an opening or at a latching edge of the hinge cup. In a kinematic reversal it is also possible that the arresting element is mounted on the hinge cup and in the mounted position engages into an opening or latching edge arranged on the housing of the damping device.

It can be provided that the first and second fixing means are operative between the housing of the damping device and a side wall of the hinge cup. Alternatively or supplemental thereto it may also be possible that the first and second fixing means are operative between the housing of the damping device and the bottom of the hinge cup or a support portion (in particular a fixing projection) associated with the hinge cup.

In that respect it is possible that the fixing projection is provided for mounting a spring which urges the hinge cup relative to the fitment portion into the completely closed position and/or into the completely open position. That fixing projection can thus also be used as a support element for the housing of the damping device. The fixing projection can extend at least portion-wise within the hinge cup, the fixing projection having a recess provided for receiving the housing of the damping device—in particular for receiving and guiding a linearly displaceable slider of the damping device.

In a preferred configuration of the invention it can be provided that the housing has a peripheral surface, the shape of which is adapted portion-wise to the inner shape of the hinge cup. In other words, the external shape and size of the housing of the damping device are adapted to the shape and size of the internal space in the hinge cup. That permits defined preliminary positioning of the housing, wherein after positioning has been effected the first and second fixing means can be connected together, wherein the housing of the damping device can be fixed relative to the hinge cup in positively locking relationship and/or force-locking relationship. Due to the contour of the housing of the damping device, that is adapted to the hinge cup, it bears in the mounted position for the greatest part directly against the inside wall of the hinge cup, wherein arranging it within the hinge cup is effected in a visually very inconspicuous fashion and the risk of dirt deposits between the housing of the damping device and the inside wall of the hinge cup is also reduced.

For easy dismantling of the damping device relative to the hinge cup there can be provided a release portion, by which the connection between the first and second fixing means is releasable, whereupon the housing of the damping device can be dismantled from the hinge cup. In that respect it may be advantageous if the release portion is arranged on the housing of the damping device. The release portion can be moved into a release position manually and/or by means of a tool whereby the housing of the damping device can be dismantled from the hinge cup.

Due to the first and second fixing means, hinge arrangements which already exist can be subsequently retro-fitted with a damping device, wherein the retro-fitting operation can already be effected in the factory. When the damping device is already fitted in the factory, production lines which are already there can be retained so that mounting the damping device only requires a very low level of complication and expenditure. It will be appreciated that subsequent fitting and/or dismantling of the damping device on already existing hinge arrangements can also be effected by a user. The damping device can also be inserted into the hinge cup and fixed relative to the hinge cup by way of the first and second fixing means when the hinge lever of the hinge is hingedly connected to the hinge cup.

To achieve a particularly compact structure it may be desirable if the damping device has a first and a second fluid chamber which are filled with damping fluid and which are connected together by way of a passage. In that case it may be desirable if a piston can be engaged in the first fluid chamber and thereby the volume of the first fluid chamber can be changed, and wherein arranged in the second fluid chamber is a device which is deformable or movable by a flow of damping fluid into and out of the second fluid chamber for changing the volume of the second fluid chamber.

The two fluid chambers are therefore connected in serial relationship and are in fluid-conducting communication by way of at least one passage. The damping fluid of the first fluid chamber, that is displaced during the damping stroke by the first piston, also has to flow through the passage into the second fluid chamber—apart from possible residual compressibility of the damping fluid—, wherein the volume of the second fluid chamber can be changed by the fluid pressure. The second fluid chamber therefore forms a compensation space for the displaced damping fluid, that is variable during compression or decompression respectively. The second fluid chamber can be arranged in a very compact structure relative to the first fluid chamber whereby particularly small damping device constructions can be implemented.

In an embodiment of the invention the said. device can have a deformable material portion arranged in the second fluid chamber or a piston displaceable in the second fluid chamber, whereby the volume of the second fluid chamber can be changed when damping fluid flows in or out. Thus instead of the second piston in the second fluid chamber, it is also possible to employ a deformable material portion made from a compressible material such as for example foam rubber. The arrangement of the second piston can—but does not have to—be omitted as the return movement of the first piston produces a reduced pressure and thus a suction effect so that the damping fluid present in the second fluid chamber is at least partially caused to flow back into the first fluid chamber again after damping has taken place.

In an embodiment of the invention the first fluid chamber has a first longitudinal axis and the second fluid chamber has a second longitudinal axis, wherein the first longitudinal axis and the second longitudinal axis of fluid chambers extend parallel to each other or can also extend transversely relative to each other. The passage connecting the two fluid chambers can in principle also be of a very short length (for example in the form of a hole in the function as an overflow opening). It is preferably provided that the passage connecting the two fluid chambers extends from the bottom region of the first fluid chamber to the inlet region of the second fluid chamber.

In a possible embodiment of the invention it can be provided that the damping device has a first piston and at least one second piston with a linear damping stroke, wherein the direction of the linear damping stroke of the first piston extends substantially parallel or transversely relative to the linear damping stroke of the second piston.

The first and second pistons can each be guided displaceably in a fluid chamber, wherein the two fluid chambers are connected in serial relationship and are in flow communication by way of the at least one passage. In that way it is possible to reduce the damping stroke of the first piston and therewith the structural size of the damping device. The damping medium of the first fluid chamber, that is displaced during the damping stroke of the first piston, flows through the narrowed passage into the second fluid chamber whereby the flow resistance of the damping fluid present in the first fluid chamber is increased. By virtue of the resulting small structure for the damping device, it can be particularly easily accommodated within the hinge cup.

In a possible embodiment of the invention it can be provided that the direction of the linear damping stroke of the first piston relative to the linear damping stroke of the second piston includes an angle $\alpha$, wherein the angle $\alpha$ is between 70 and 110°. In a preferred configuration of the invention it can also be provided that the direction of the linear damping stroke of the first piston relative to the linear damping stroke of the second piston extends at a right angle.

In a possible embodiment the two fluid chambers can be respectively formed by the internal space of a fluid cylinder. It is however particularly preferred for the fluid chambers to be provided in a housing of the damping device so that the additional provision of fluid cylinders is not absolutely necessary. In that way the damping device can be implemented with a reduced number of components to be employed.

The damping device can have an actuating element, by which the force can be applied to the damping device, wherein the actuating element can be acted upon by one of the fitment portions or by a hinge lever arranged between the fitment portions, during the hinge movement. The hinge lever which is pivotable during the hinge movement can be caused to immerse into the hinge cup towards the end of the closing movement of the furniture hinge. In that respect a possible configuration provides that at least one of the two pistons is integrally connected to the actuating element. The integral configuration of the actuating element with one of the pistons reduces the number of components, while in addition force can be applied directly to the damping device.

In a possible embodiment the actuating element can have a linearly displaceable slider which can be acted upon by one of the fitment portions or by hinge lever arranged between the fitment portions as from a predetermined relative position of the fitment portions with respect to each other. The slider can be in the form of a sliding wedge having an inclined surface which can be acted upon by one of the fitment portions or by the hinge lever towards the end of the closing movement and/or the end of the opening movement.

To avoid unwanted tilting of the sliding slider during the damping operation it may be advantageous if the slitter has a guide—preferably in the form of a slot—, whereby the slider is displaceable relative to a fixing projection arranged on the hinge cup. The fixing projection can be provided at the same time for mounting a spring device which urges the two fitment portions into an end position. In that case the spring device can urge the fitment portions in the direction of the completely open position and/or in the direction of the completely closed position, wherein the spring action begins only towards the end of the closing process and/or towards the end of the opening process. The proposed damping device is therefore desirably provided to damp an opening movement and/or a closing movement over a portion of the total opening angle range of the two fitment portions relative to each other.

BRIEF DESCRIPTION OF THE DRAWINGS

Further detail and advantages of the present invention will be described by means of the specific description hereinafter. In the drawings:

FIG. 2 shows a perspective view of a furniture hinge having a damping device integrated in the hinge cup, FIGS. 11a-11d show various views of a further embodiment of a damping device having a release portion for dismantling purposes.

DETAILED DESCRIPTION OF THE INVENTION

Figure 1:
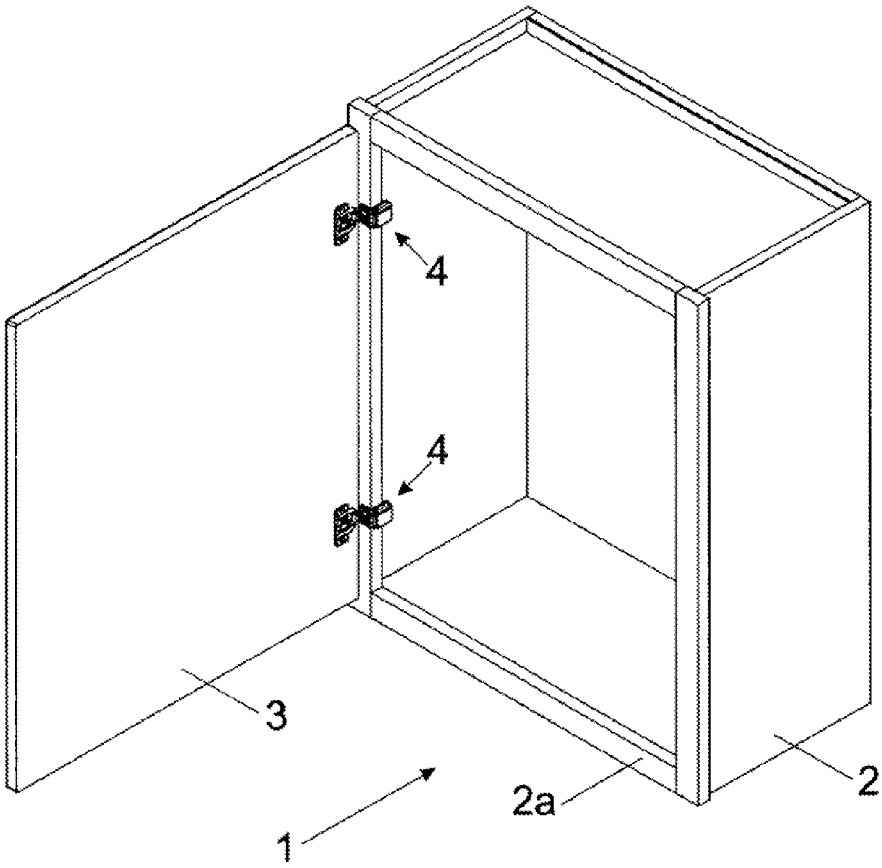
FIG. 1 shows a perspective view of an article of furniture having a movable furniture part which is pivotally mounted to the furniture carcass by way of furniture hinges according to the invention.

FIG. 1 shows a perspective view of an article of furniture 1 having a furniture carcass 2, wherein a movable furniture part 3 in the form of a pivotable door is fixed by way of furniture hinges 4 according to the invention to a frame 2a provided or arranged on the furniture carcass 2. The movable furniture part 3 is mounted pivotably between a closed position of closing the furniture carcass 2 and an open position.

FIG. 2 shows a possible embodiment of a furniture hinge 4, wherein a first fitment portion 5 is associated with the furniture carcass 2 and a second fitment portion 6 is associated with the movable furniture part 3. As shown in the Figure, the canvass fitment portion 5 can be L-shaped or U-shaped and in the mounted position can at least partially embrace the frame 2a shown in FIG. 1. *Thus, as shown in FIGS. 1 and 2, the first fitment portion 5 has a base plate 5a and at least one leg 5b extending perpendicularly from the base plate 5a.* It will be appreciated that the fitment portion 5 may also be in the form of a hinge arm. The second fitment portion 6 has a hinge cup 6a which can be sunk in a bore on the movable furniture part 3. The hinge cup 6a has a flange 6b which in the mounted position bears against the inside of the movable furniture part 3. Arranged between the fitment portion 5 and the hinge cup 6a is a hinge lever 7 which is mounted displaceably and/or tiltably relative to the first fitment portion 5 by way of an adjusting device 8. The hinge lever 7 is mounted pivotably to the hinge cup 6a at an axis of rotation on the other side. In the illustrated embodiment therefore the furniture hinge 4 is in the form of a single-axis hinge. It is possible to see a spring device 9 which urges the two fitment portions 5, 6 in the direction of the closed position or holds the fitment portions 5, 6 in a closed position. A damping device 10 is arranged substantially completely within the hinge cup 6a, wherein the damping device 10 is provided for damping a relative movement of the two fitment portions 5, 6 relative to each other over a part of the movement through the maximum opening angle of the two fitment portions 5, 6. The damping device 10 has an actuating element 11 in the form of a linearly displaceable slider 11a which is acted upon by the hinge lever 7 towards the end of the closing movement of the furniture hinge 6 and thereby applies the force to the damping device 10.

Figure 3A:
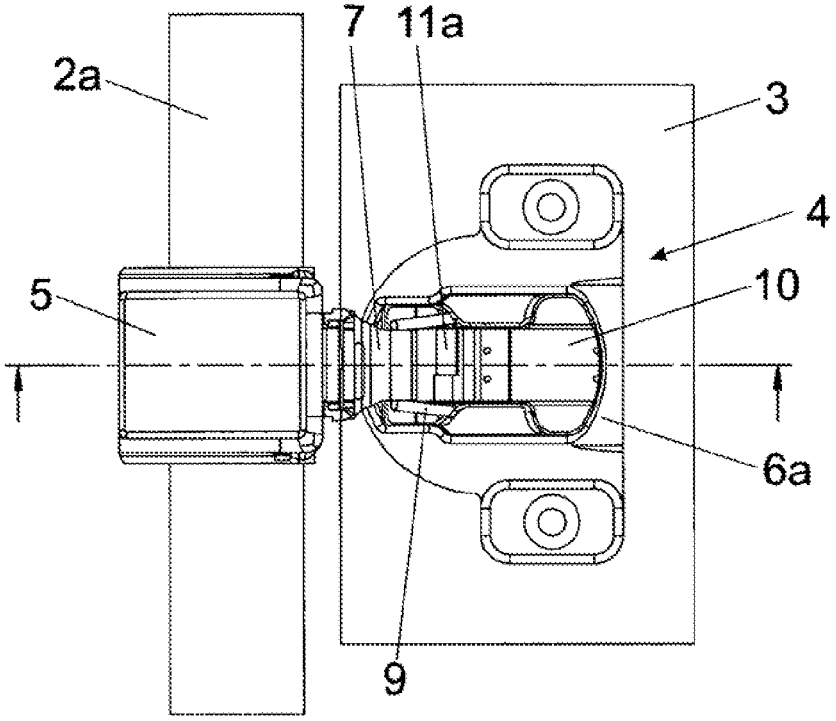
FIGS. 3a, 3b show a side view of the furniture hinge mounted to the furniture parts in an open position and a cross-sectional view thereof.

FIG. 3a shows a side view of the open furniture hinge 4 in the mounted condition. The first fitment portion 5 is fixed to the frame 2a of the furniture carcass 2 while the second fitment portion 6 is mounted with the hinge cup 6a to the movable furniture part 3. It is possible to see the damping device 10 whose arcuate peripheral edge is at least partially adapted to the contour of the inside wall of the hinge cup 6a. The housing of the damping device 10 can be for example at least approximately of a mushroom-shaped configuration in plan view. The hinge lever 7 which is pivoted during the hinge movement acts on the linearly displaceable slider 11a towards the end of the closing movement whereby the damping process is initiated. The Figure also shows the spring device 9 which in the illustrated embodiment performs the function of at closing spring.

Figure 3B:
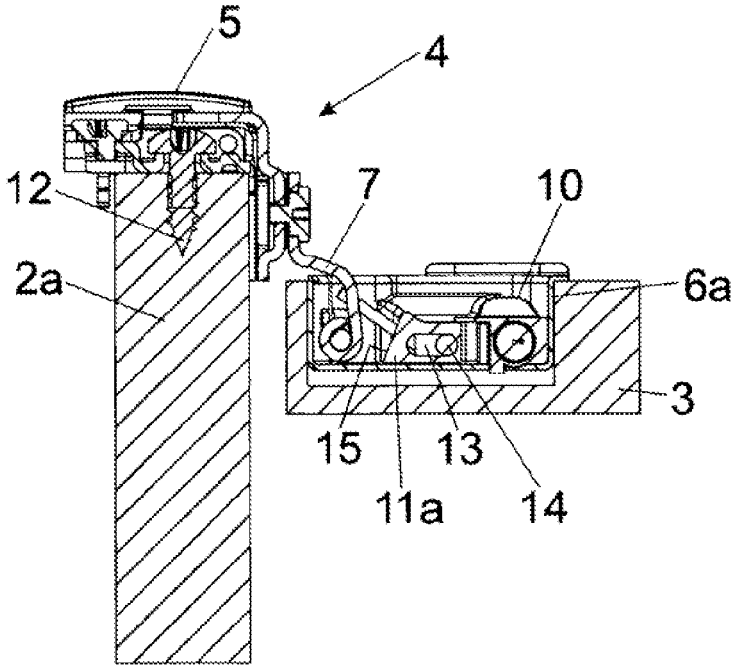

FIG. 3b shows a vertical section along the arrows shown in FIG. 3a. The carcass fitment portion 5 is fixed to the frame 2a by way of a screw 12. The hinge cup 6a is sunk in the movable furniture part 3, the damping device 10 with the slider 11a being completely integrated in the hinge cup 6a. The slider 11a has an inclined surface 15 which is acted upon by the hinge lever 7 as from a predetermined relative position of the fitment portions 5 and 6 with respect to each other. The slider 11a has a slot 13 so that the slider 11a is displaceable guidedly during the damping process relative to a fixing projection 14 arranged stationarily on the hinge cup. In the illustrated Figure the hinge lever 7 is in a position of being spaced from the inclined surface 15 of the slider 11a.

Figure 4A:
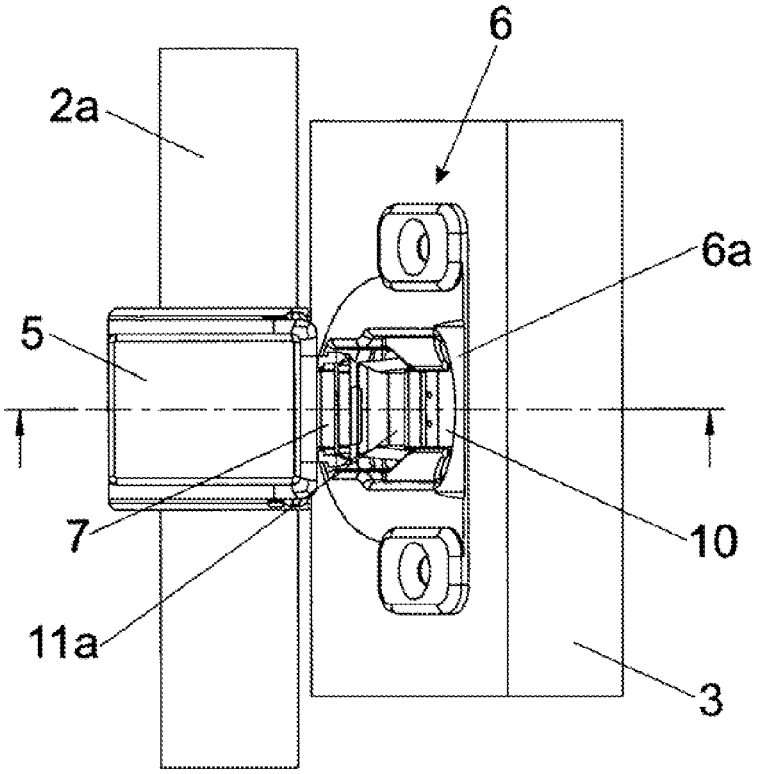
FIGS. 4a, 4b show a side view of the furniture hinge mounted to the furniture parts in an intermediate position and a cross-sectional view thereof.
Figure 4B:
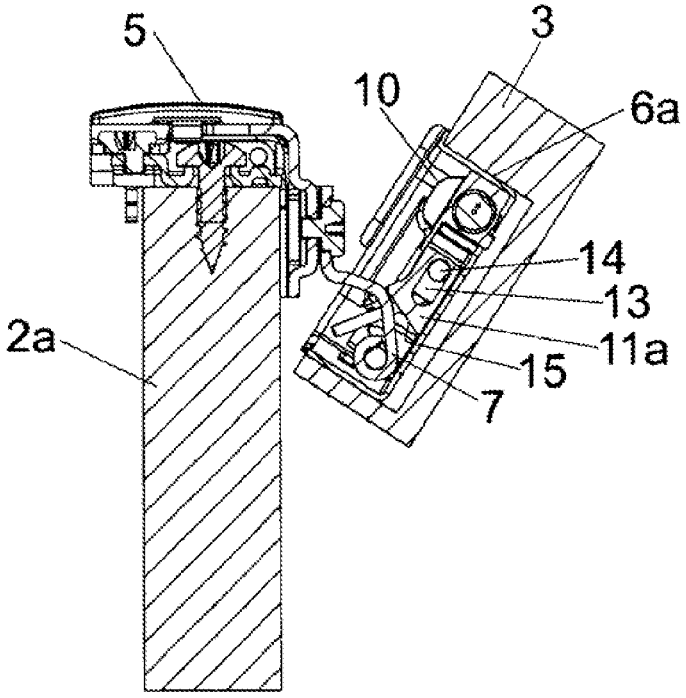

FIG. 4a shows a view similar to FIG. 3a, with the difference that the movable furniture part 3 has been further moved in the closing direction and the hinge lever 7 now encounters the slider 11a of the damping device 10, which can be particularly clearly seen from the sectional view in FIG. 4b. The cranked hinge lever 7 now abuts against the inclined surface 15 of the slider 11a whereby the damping process is initiated.

Figure 5A:
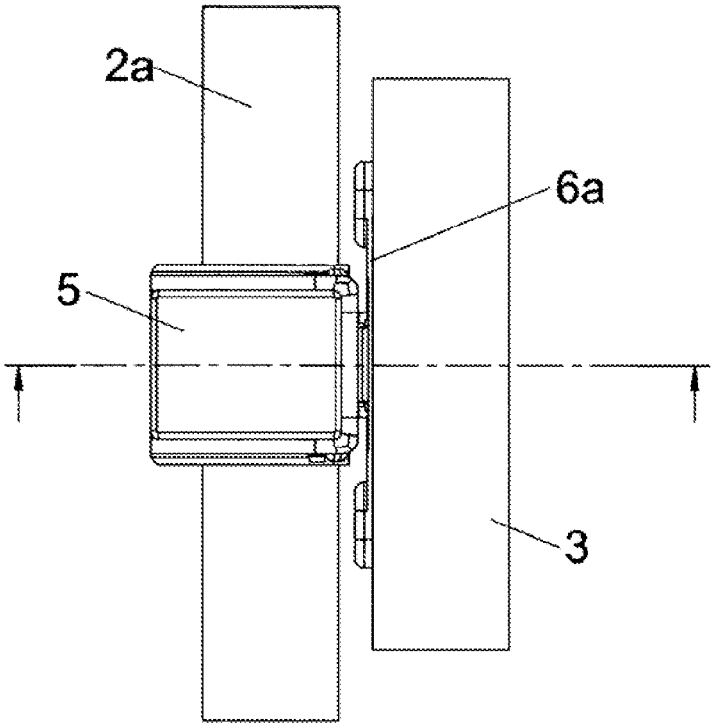
FIGS. 5a, 5b show a side view of the furniture hinge mounted to the furniture parts in a closed position and a cross-sectional view thereof.
Figure 5B:
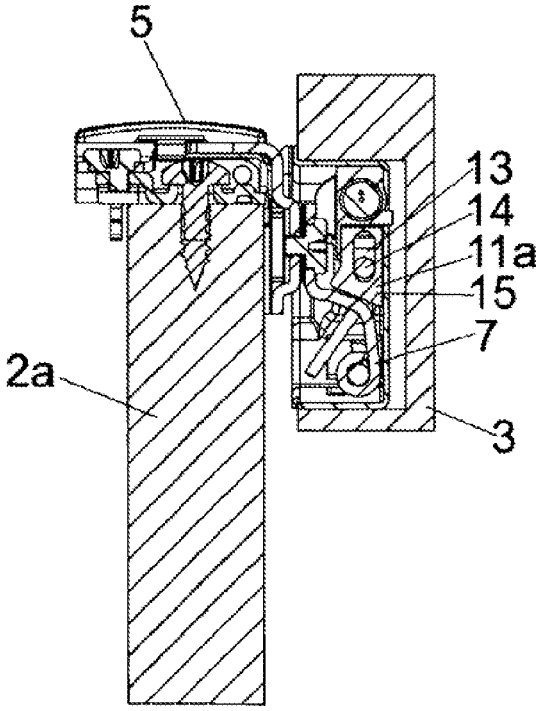

FIG. 5a shows the completely closed position of the movable furniture part 3 relative to the frame 2a, the damping process already being concluded. It can be seen from the sectional view in FIG. 5b that the hinge lever 7 has displaced the slider 11a by way of the inclined surface 15 thereof so that the stationary fixing projection 14, in comparison with FIG. 4b, bears against the opposite end of the slot 13. The movement to be damped has been applied to the damping device 14 by the movement of the slider 11a.

Figure 6:
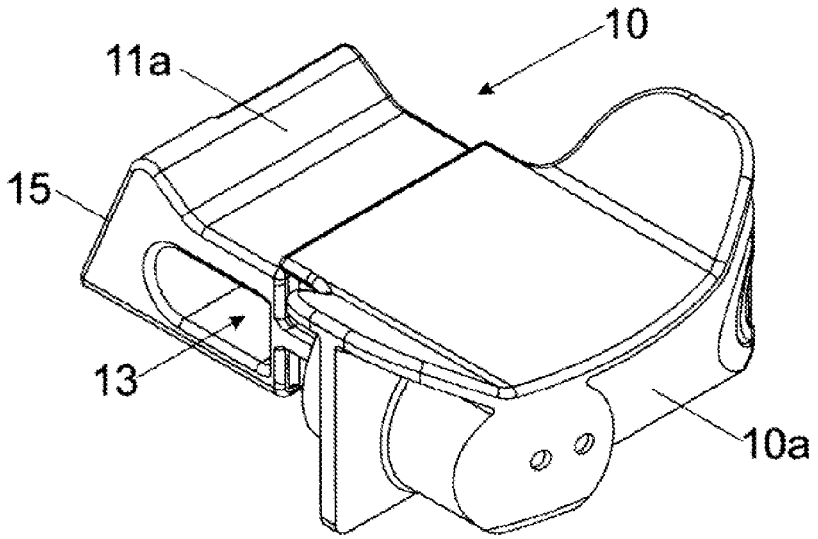
FIG. 6 shows a perspective view of the damping device.

FIG. 6 shows the damping device 10 which can be completely integrated into the hinge cup 6a and the housing 10a of which is at least portion-wise adapted to the inside shape of the hinge cup 6a. The housing 10a has an arcuate peripheral edge which in the mounted position bears at least region-wise against the inside wall of the hinge cup 6a. The slider 11a with its inclined surface 15 and its slot 13 is mounted displaceably relative to the housing 10a during the damping stroke and during the return stroke.

Figure 7A:
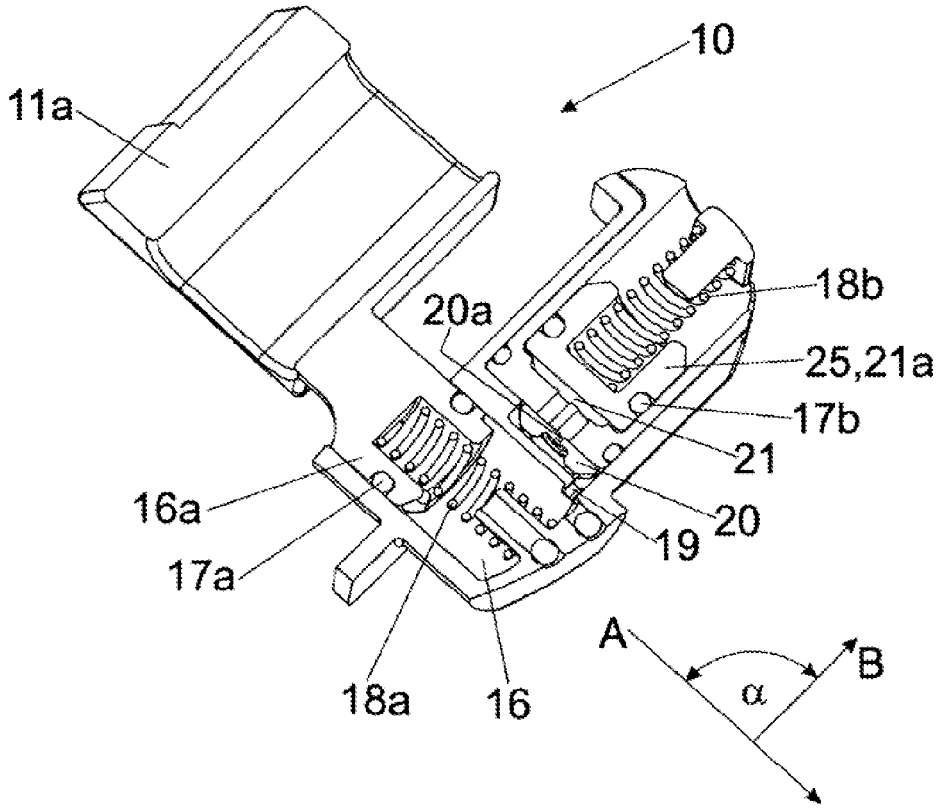
FIGS. 7a-7c show views in horizontal section illustrating positions of the two pistons during the damping stroke and during the return stroke.

FIG. 7a shows a perspective view in horizontal section of the damping device 10, with reference to which the operating principle of the damping device 10 is to be described. The Figure shows a first fluid chamber 16 in which a first piston 16a is linearly displaceably guided. The damping device 10 is in the form of a fluid damper, the first fluid chamber 16 being filled with a damping fluid (for example a liquid, an oil or, with a suitable structural size, also with air). A seal 17a seals the first piston 16a with respect to the inside wall of the first fluid chamber 16. Associated with the first fluid chamber 16 is a return mechanism 18a in the form of a spring which, after the damping stroke has been effected, moves the piston 16a back into a position for the next damping stroke again. The return mechanism 18a can also be arranged outside the fluid chamber 16. The slider 11a is preferably integrally connected to the first piston 16a so that a movement of the slider 11a at the same time also leads to movement of the first piston 16a into the first fluid chamber 16. The device 25 arranged in the second fluid chamber 21 for altering the volume in that second fluid chamber, in the illustrated embodiment, includes a displaceable piston 21a, by which the volume of the second chamber 21 can be changed when damping fluid flows in or out.

The damping fluid is pressed through the passage 19 and through a through opening 20a in a switching blade 20 into the second fluid chamber 21 by the first piston 16a being pushed into the fluid chamber 16. The seal 17b seals the piston 21a with respect to the second fluid chamber 21a. The second piston 21a is also displaced into a rearward end position by the damping fluid being pressed from the first fluid chamber 16 into the second fluid chamber 21. The damping fluid is exclusively between the first piston 16a and the second piston 21a. It can be seen that the direction of movement A of the first piston 16a extends transversely relative to the direction of movement B of the second piston 21a. The direction of movement A of the first piston 16a includes an angle $\alpha$ which is preferably between 70° and 110° with the direction of movement B of the second piston 21a. Preferably the directions of movement A and B of time first piston 16a and the second piston 21a are at a right angle to each other. The directions of movement A, B can also extend in mutually parallel spaced relationship.

Figure 7B:
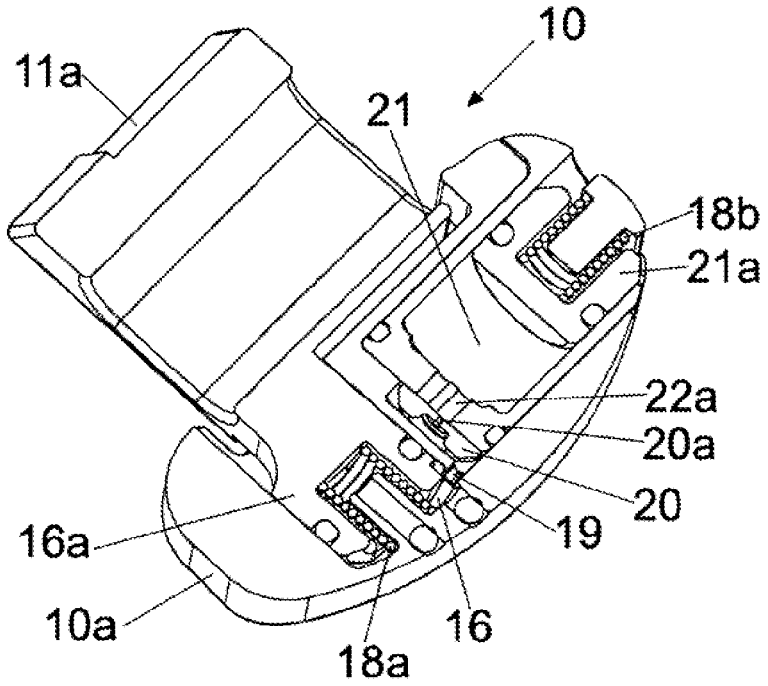

FIG. 7b shows the first piston 16a pushed completely into the first fluid chamber 16, that is to say the damping process is already concluded. The fact that the piston 16a was pushed into the first fluid chamber 16 provided that the damping fluid in the first fluid chamber 16 was pressed through the passage 19, the opening 20a in the switching blade 20 and the through-flow opening 22a into the second fluid chamber 21, whereupon the second piston 21a was displaced within the second fluid chamber 21 into the rearward end position shown. The size of the through opening 20a in the switching blade 20 increases with increasing pressure actuation by the damping fluid, whereby the flow cross-section of the through opening 20a can be increased. The switching blade 20 is preferably made from rubber-elastic material.

Figure 7C:
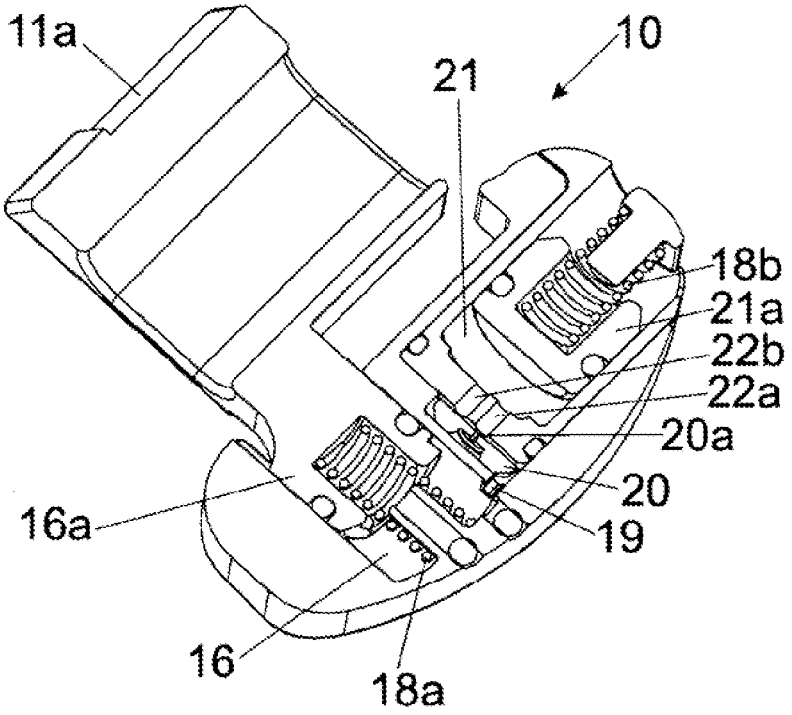

In FIG. 7c the two pistons 16a, 21a have been partially returned main by the two return mechanisms 18a, 18b so that the pistons 16a, 21a are moved in the direction of the readiness position shown in FIG. 7a again. The return mechanism 18b therefore moves the second piston 21a in the opposite direction again, in which case the damping fluid in the second fluid chamber 21 can flow back through the two through-flow openings 21a and 21b. Starting from the first position shown in FIG. 7b (in which the damping fluid flows exclusively through the through opening 20a into the second fluid chamber 21) the switching blade 20 was moved into a second position as shown in FIG. 7c in which the switching blade 20 lifts off the through-flow openings 22a, 22b so that, in the return stroke, the damping fluid can also flow back around the switching blade 20 in the direction of the first fluid chamber 16. In that way the damping device 10 can be very quickly moved into a readiness position for the next damping stroke again. At the same time the first piston 16a of the first fluid chamber 16 is also moved back by the return mechanism 18a and can again assume the readiness position. It can also be provided that the arrangement of the second return mechanism 18b can be omitted and only the first return mechanism 18a is provided. In that way the return movement of the first piston 16a results in a reduced pressure being produced in the first fluid chamber 16, by which the damping fluid coming from the second fluid chamber 21 due to a suction effect passes into the first fluid chamber 16 again. Starting from FIG. 7c the two pistons 16a, 21a can again be moved back into the starting position shown in FIG. 7a.

The switching blade 20 therefore performs a triple function, more specifically a) for building up the pressure of the damping medium in the first fluid chamber 16, b) overload safeguard by radial expansion of the through opening 20 so that the flow cross-section can be increased, and c) damping return by lifting the switching blade 20 off the through-flow openings 22a and 22b.

In an embodiment of the invention it is provided that the piston surface of the first piston 60 and the piston surface of the second piston 21 have an operative piston surface of the same size. It is however also possible for the effective piston surface of the first piston 16a and that of the second piston 21a to be of differing sizes so that it is possible to provide a travel step-down effect in respect of the second piston 21. When therefore the effective piston surface of the second piston 21 is larger than that of the first piston 16, a damping stroke of the first piston 16a also leads to a reduced damping stroke of the second piston 21a. The length of the second fluid chamber 21 and thus the size of the housing 10a can possibly also be reduced by virtue of the reduced damping stroke of the second piston 21a.

Figure 8A:
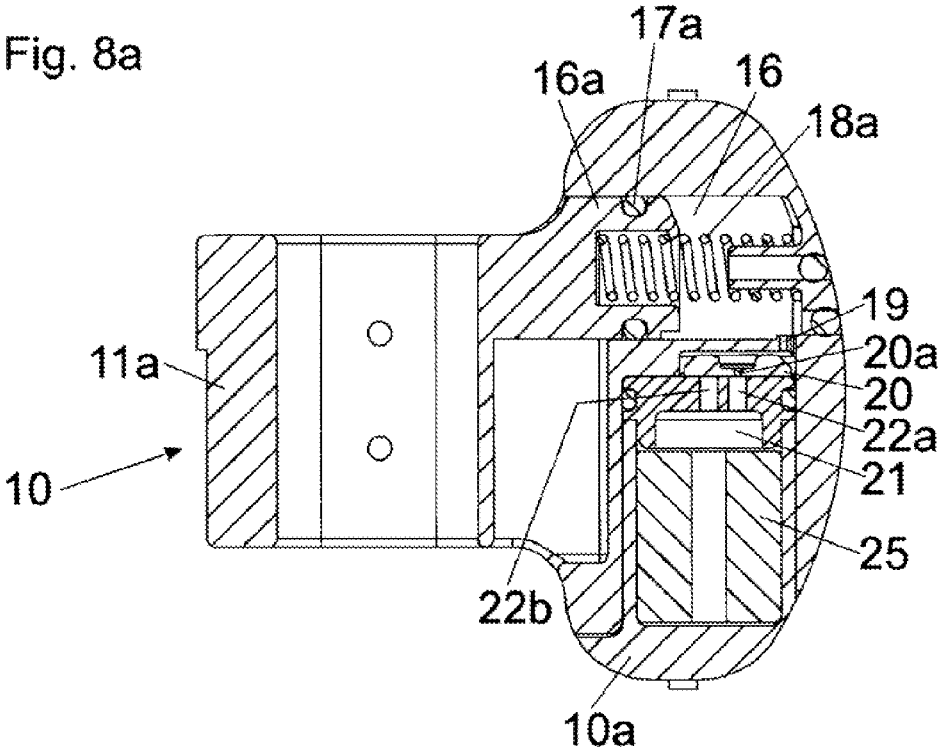
FIGS. 8a, 8b show am alternative embodiment of a damping device, wherein a deformable material portion is arranged in the second fluid chamber for changing the volume of the second fluid chamber.
Figure 8B:
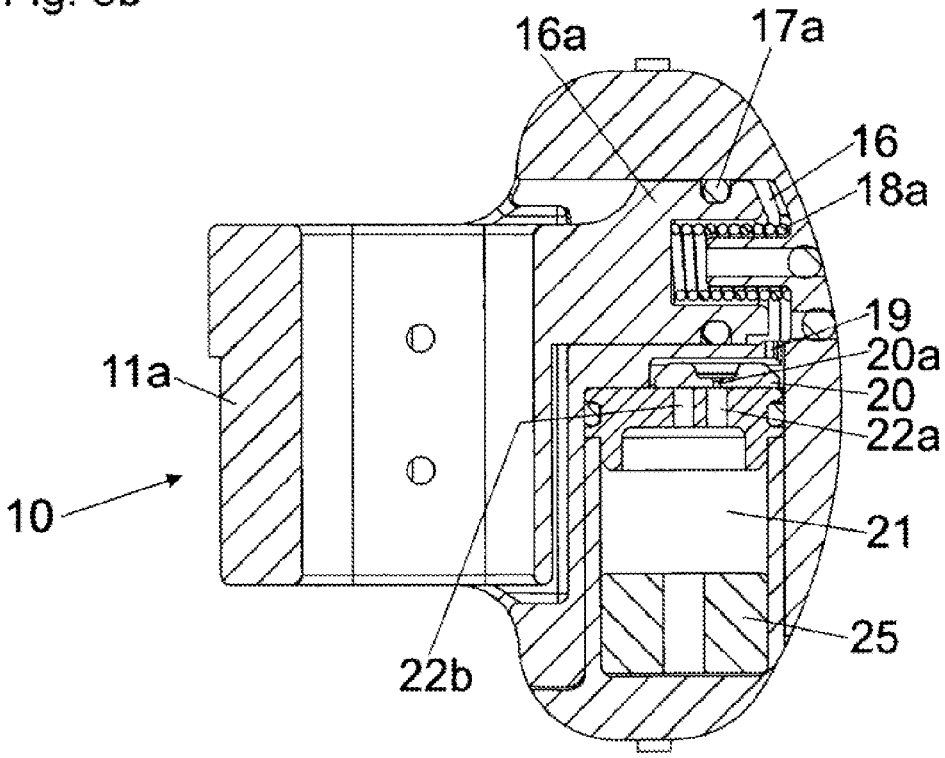

FIG. 8a shows an alternative embodiment of a damping device 10. Similarly to the embodiment of FIGS. 7a-7c, there is provided a slider 11a which is integrally connected to the first piston 16a so that the first piston 16a engages into the first fluid chamber 16 in the damping stroke. A seal 17a seals off the first piston 16a relative to the first fluid chamber 16. In the damping stroke the damping fluid displaced by the first piston 16a con flow by way of the through opening 20a in the switching blade 20 and through the through-flow opening 22a into the second fluid chamber 21. In the illustrated embodiment the device 25 arranged in the second fluid chamber 21 includes a compressible deformable material portion, by which the volume of the second fluid chamber 21 can be altered when damping fluid flows in or out. FIG. 8a shows the first piston 16a in a readiness position for the damping stroke. In FIG. 8b the fact of the first piston 16a being pushed into the first fluid chamber 16 provided that the damping fluid was urged into the second fluid chamber 25 by way of the above-described common paths, whereby the device 25 was deformed and the volume of the second fluid chamber 21 increased. When the slider 11a is no longer acted upon by the hinge lever 17 of the furniture hinge 4 then the first piston 16a of the first fluid chamber 16 is moved back into the position shown in FIG. 8a again by the return mechanism 18a. As a result, a reduced pressure is produced in the first fluid chamber 16, whereby the suction effect causes the fluid in the second fluid chamber 21 to be drawn back through the through-flow openings 22a, 22b and around the switching blade 20 into the first fluid chamber 16 again, whereupon the device 25 of the second fluid chamber 21 also expands again and again assumes the FIG. 8a position. It is therefore not absolutely necessary for a displaceable second piston 21a having its own return mechanism 18b also to be provided in the second fluid chamber 21. The device 25 can have a compressible material portion (for example a TPU plastic portion or a foam rubber). It will be appreciated that the device 25 can also include a second piston 21a as described hereinbefore, which is supported displaceably within the second fluid chamber 21.

Figure 9A:
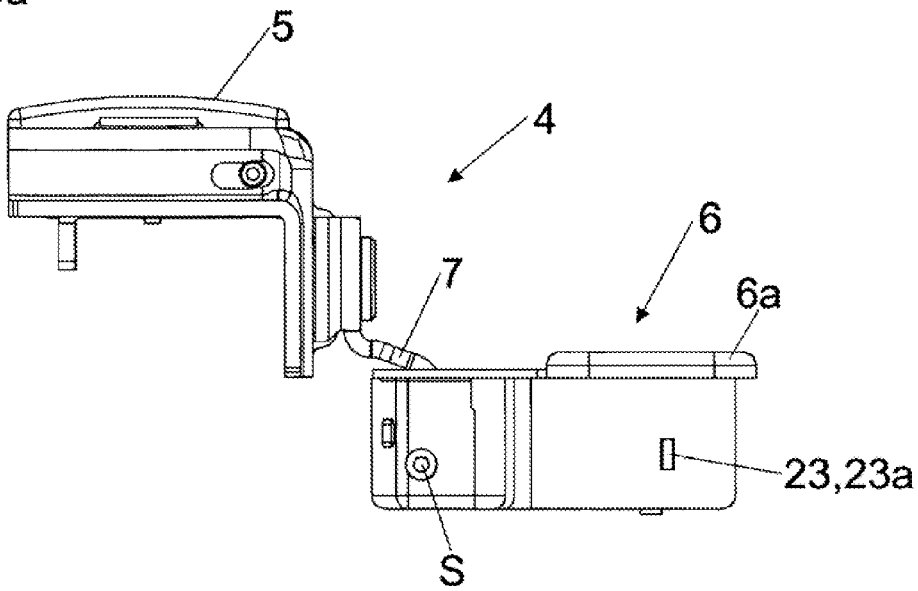
FIGS. 9a, 9b show a possible embodiment of a damping device which can be mounted and/or removed on the hinge cup without a tool, having a fixing device for fixing to the furniture hinge.
Figure 9B:
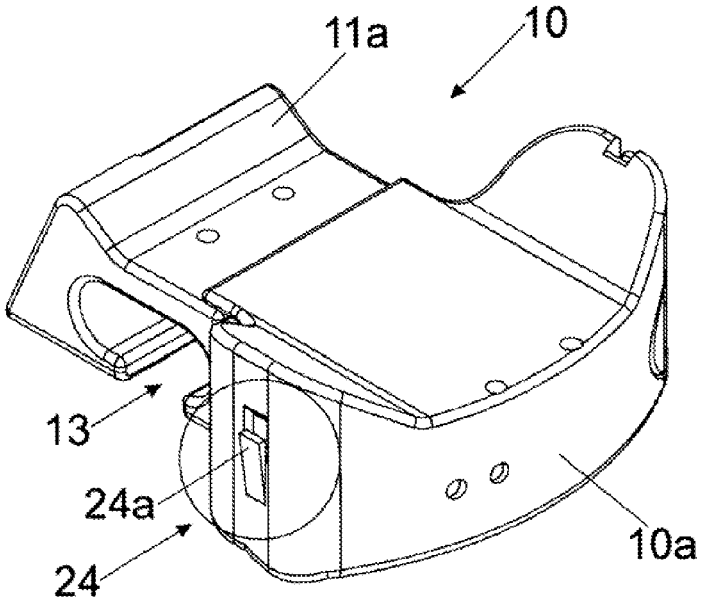

FIGS. 9a and 9b show a possible embodiment illustrating how the furniture hinge 4 can also be fitted with a damping device 10 subsequently (that is to say retro-fitted either at the factory or also by a user). FIG. 9a shows the carcass fitment portion 5 and the door fitment portion 6 with the hinge cup 6a connected pivotably to the carcass fitment portion 5 by way of the hinge lever 7. The hinge lever 7 is mounted to the hinge cup 6a at the axis of rotation S. Provided on the hinge cup 6a are diagrammatically shown fixing means 23 (for example in the form of a recess, a latching edge or an opening 23a) while the housing 10a of the damping device 10 is provided with corresponding fixing means 24 (for example in the form of a resilient arresting element 24a). The housing 10a of the damping device 10 can therefore be releasably connected to the hinge cup in the illustrated mounting position by way of the first and second fixing means 23, 24, preferably being automatically latchable.

FIG. 9b shows the damping device 10 with the housing 10a and the slider 11a displaceable relative thereto. For fixing to the furniture hinge 4 the housing 10a has fixing means 24 with at least one arresting element 24a which is in engagement in the mounted position with the opening 23a, shown in FIG. 9a, of the hinge cup 6a. In that way the housing 10a of the damping device 10 can be fixed relative to the hinge cup 6a. In contrast to the slot 13 shown in FIG. 6 the slot 13 in FIG. 9b is open downwardly in order thereby to fit the slider 11a and therewith the damping device 10 subsequently to the fixing projection 14 shown in FIGS. 3b, 4b and 5b respectively. In the mounted condition of the housing 10a the arcuate peripheral surface thereof bears against the inside wall of the hinge cup 6a and does not project beyond the hinge cup 6a. The arresting element 24a is resilient, is acted upon by a spring or is formed directly by a spring and can be moved from the mounted position on the hinge cup 6a into a release position by applying pressure in opposition to the spring force of the arresting element 24a so that the housing 10a of the damping device 10 can be removed again from the hinge cup 6a. The fixing means 24 with the arresting element 24a and the opening 23a on or in the hinge cup 6a is only shown by way of example, it will be appreciated that other possible forms of mounting and removal are also possible. In a kinematic reversal it is also possible for the resilient arresting element to be arranged on the hinge cup 6a and for the opening 23a or latching edge also to be arranged on the housing 10a of the damping device 10.

Figure 10A:
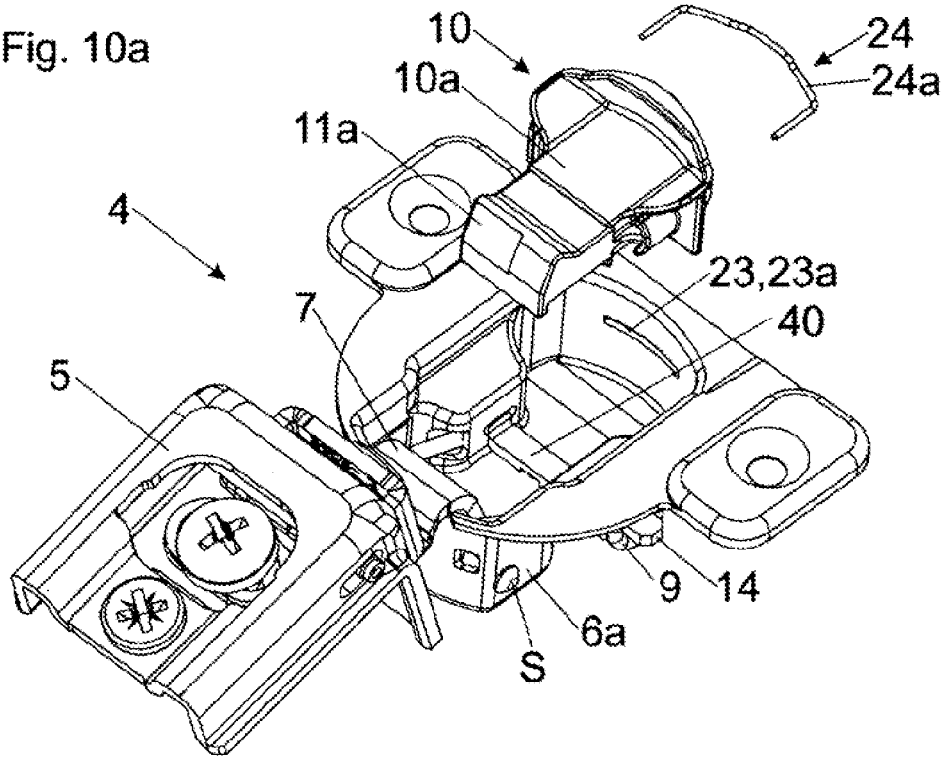
FIGS. 10a, 10b show a further embodiment of a damping device which can be releasably fixed within the hinge cup.

FIG. 10a shows a further possible way of fixing a damping device 10 which can be arranged in the mounted position entirely within a hinge cup 6a. The damping device 10 includes a housing 10a which can be fitted into the hinge cup 6a from above (therefore substantially at a right angle to the bottom of the hinge cup). The housing 10a of the damping device 10 has a first fixing means 24 in the form of a clip-like or circlip-like spring while the hinge cup 6a is provided with second fixing means 23 in the form of an elongate recess 23a, wherein the housing 10a of the damping device 10 and the hinge cup 6a can be releasably connected together in the mounted position by way of the first and second fixing means 23, 24. It is also possible to see a fixing projection 14 arranged within the hinge cup 6a and extending substantially parallel to an axis of rotation S of the furniture hinge 4. In the interior of the hinge cup 6a the fixing protection 14 has a recess 40 provided for receiving and guiding the linearly displaceable slider 11a. The flattening afforded by the recess 40, or the lower position of the fixing projection 14, permits an enlarged structural space for the housing 10a of the damping device 10.

Figure 10B:
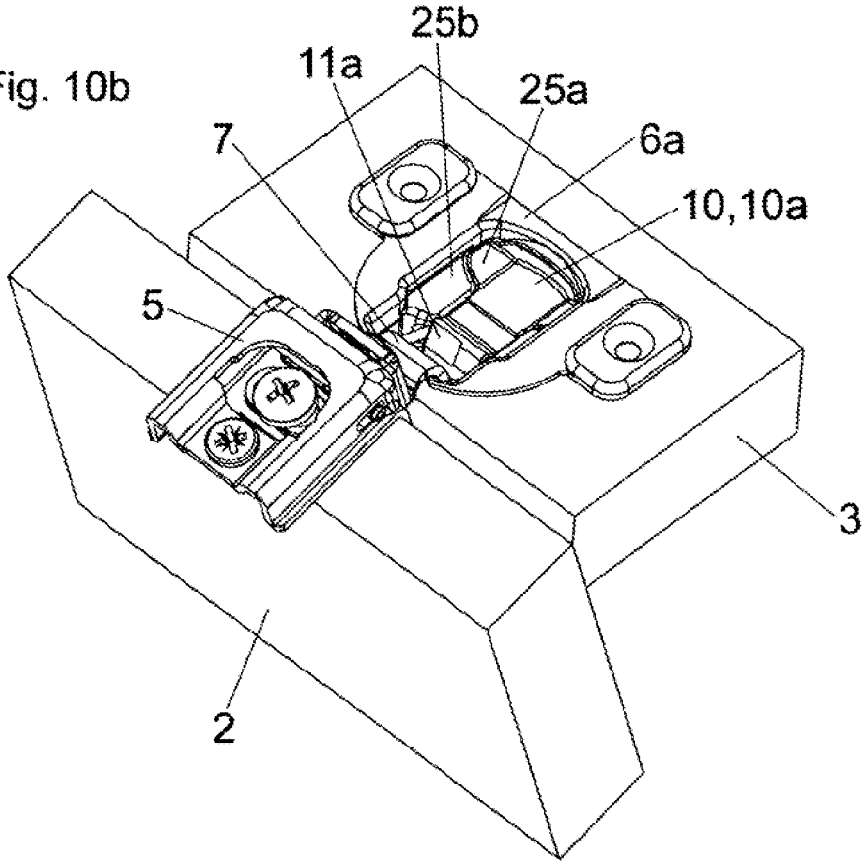

FIG. 10b shows the mounted position of the damping device 10 within the hinge cup 6a. In that position the damping device 10 does not project beyond the plane of the opening of the hinge cup 6a. The housing 10a has a shoulder-shaped abutment 25a which in the mounted position is supported against a corresponding counterpart abutment 25b of the hinge cup 6a. The peripheral surface of the damping device 10 is adapted to the contour of the internal space in the hinge cup 6a. Towards the end of the closing movement of the movable furniture part 3 relative to the stationary furniture carcass 2 the hinge lever 7 bears against the slider 11a of the damping device 10, whereby the damping process is initiated.

FIG. 11a shows a possible way of removing the damping device 10 fixed in the hinge cup 6a. The housing 10a of the damping device 10 has at least one release portion 26, by which the connection between the first and second fixing means 23, 24 is releasable so that the housing 10a can be completely removed. The housing 10a can be levered out of the hinge cup 6a by applying a screwdriver 27 to the release portion 26 and the carcass abutment portion 5. Removal is of relevance in that respect as a damping effect for the mobile hinge 4 is sometimes not wanted at all. If for example the movable furniture part 3 is pivotably mounted to the furniture carcass 2 by way of a plurality of furniture hinges 4, it may be sufficient for only one furniture hinge 4 to be fitted with a damping device 10, while the other furniture hinges 4 do not have any damping device in order thereby to ensure reliable closure of lighter movable furniture parts 3. FIG. 11b shows a perspective view from the front of the damping device 10, from which it is possible to see the housing 10a with the shoulder-shaped abutment 25a and the linearly displaceable slider 11a. In the illustrated embodiment the release portion 26 for dismantling of the damping device 10 is provided in one piece on the housing 10a. FIG. 11c shows a perspective view than the front of the damping device 10 while FIG. 11d shows a perspective view from the front of the damping device 10.

Figure 12A:
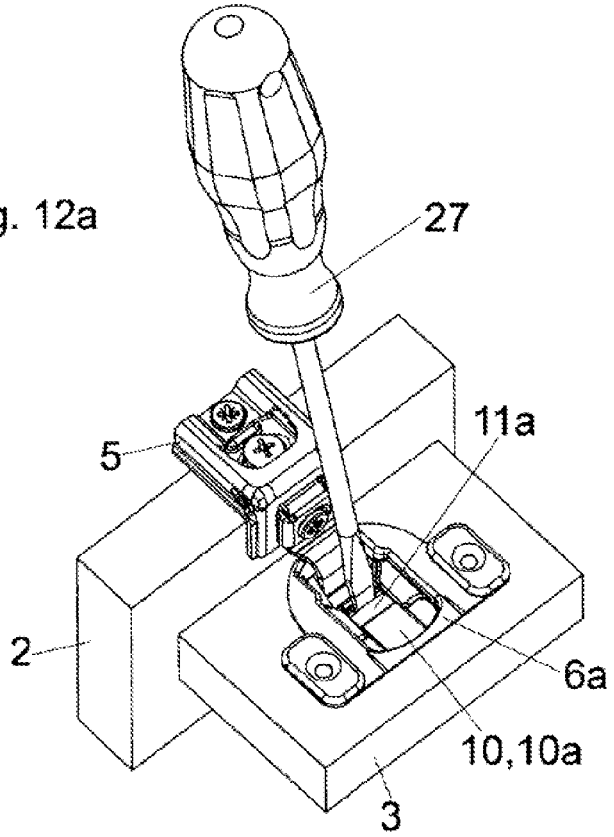
FIGS. 12a-12d show a damping device having various configurations of a release portion for dismantling the damping device.
Figure 12B:
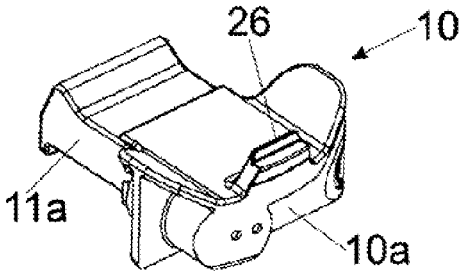
Figure 12C:
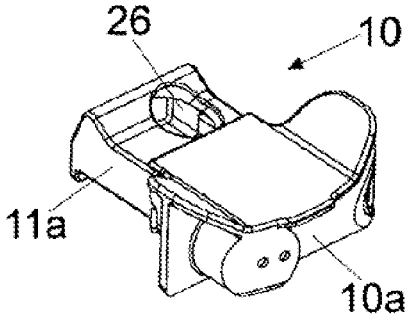
Figure 12D:
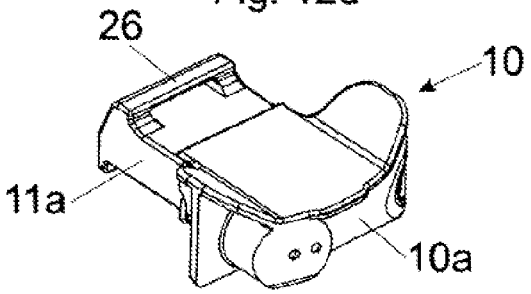

FIG. 12a shows a further possible way of dismantling the damping device 10 by means of a slot-type screwdriver 27 which in the illustrated embodiment can engage the linearly displaceable slider 11a. Various configurations of the release portion 26 are shown in FIGS. 12 through 12d. In FIG. 12b the release portion 26 is in the form of a bar projecting upwardly from the housing 10a. In FIG. 12c the release portion 26 is in the form of a recess in the displaceable slider 11a, the release portion 26 being adapted to receive a cross-head screwdriver. In FIG. 12d the release portion 26 is also provided on the slider 11a and the release portion 26 with the slider 11a jointly provide a slot-shaped recess in which a slot-type screwdriver can engage for dismantling of the damping device 10.

Figure 13:
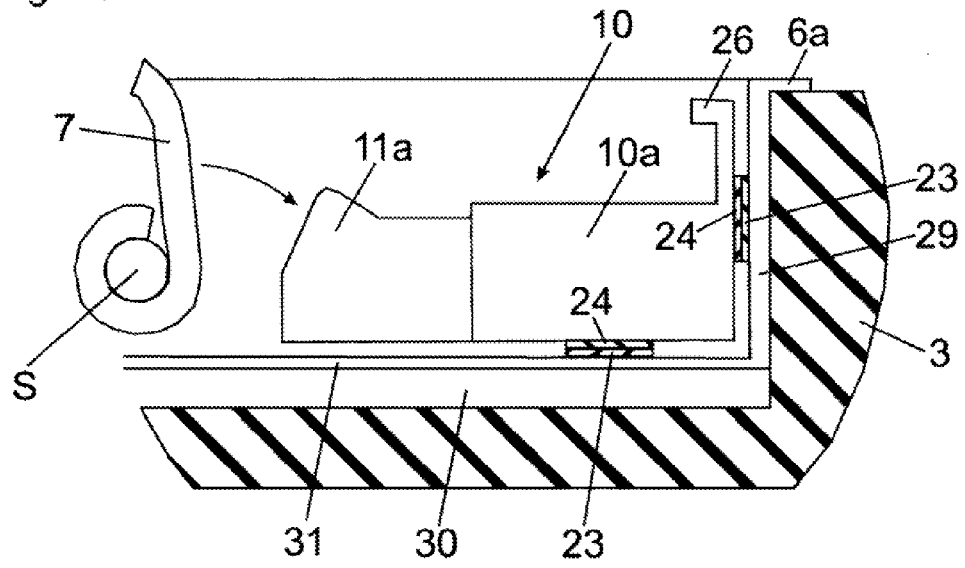
FIG. 13 shows a highly diagrammatic view of a hinge cup countersunk in a standard bore, wherein the fixing means for fixing the damping device are operative between the housing of the damping device and the bottom and/or a side wall of the hinge cup.

FIG. 13 shows a highly diagrammatic view of a hinge cup 6a sunk in a provided standard bore 30 in the movable furniture part 3. The hinge cup 6a has a bottom 31 and a side wall 29 extending therearound. The damping device 10 with the housing 10a and the linearly displaceable slider 11a includes first fixing means 24 while second fixing means 23 are associated with the hinge cup 6a, wherein the housing 10a of the damping device 10 can be releasably connected together in the intended mounted position by way of the first and second fixing means 23, 24. The second fixing means 24 of the housing 10a can therefore be releasably connected to the bottom 31 of the hinge cup 6a and/or to a side wall 29 thereof. The hinge lever 7 mounted at the axis of rotation S acts on the linearly displaceable slider 11a as from a predetermined relative position of the hinge cup 6a whereby the slider is pushed into the housing 10a and initiates the damping process.

Figure 14A:
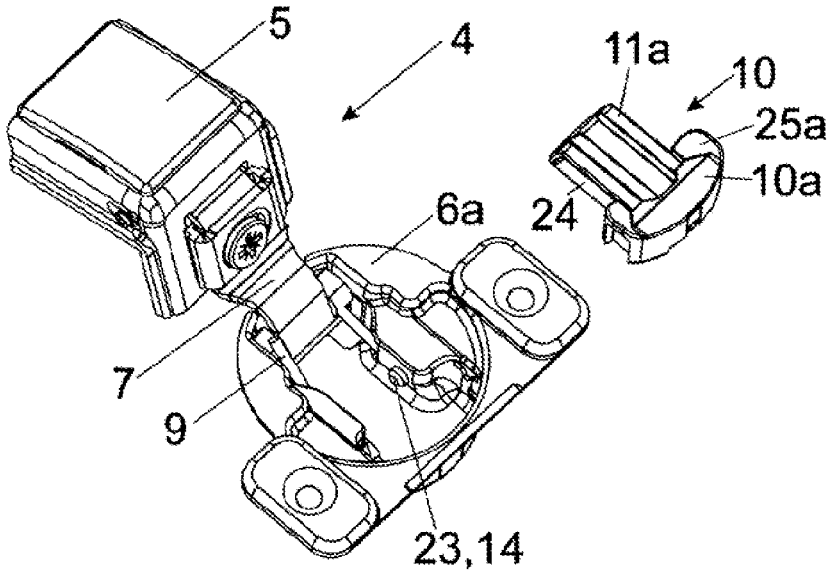
FIGS. 14a-14c show the damping device to be inserted into the hinge cup in a dismantled position and in the mounted position and a slider of the damping device with fixing means provided thereon.

FIG. 14a shows a perspective view of the furniture hinge 4, wherein the fitment portion 5 in the form of the hinge arm is hingedly connected to the hinge cup 6a by way of at least one hinge lever 7. The housing 10a of the damping device 10 can be fitted into the hinge cup 6a from above when the hinge levers 7 and the hinge arm 5 are mounted, and can be releasably fixed therein. The damping device 10 has a slider 11a movable relative to the housing 10a, wherein the first fixing means 24 are provided on the slider 11a so that the housing 10a of the damping device 10 can be releasably connected to the hinge cup 6a indirectly by way of the slider 11a. In the illustrated Figure the second fixing means 23 of the hinge cup 6a are formed by a fixing projection 14 which projects laterally inwardly from an inside wall of the hinge cup 6a and is provided for connection to the slider 11a. The fixing projection 14 can pass through the side wall of the hinge cup 6a and in so doing also serve to receive the spring device 9, by which the furniture hinge 4 is movable into the completely closed position.

Figure 14B:
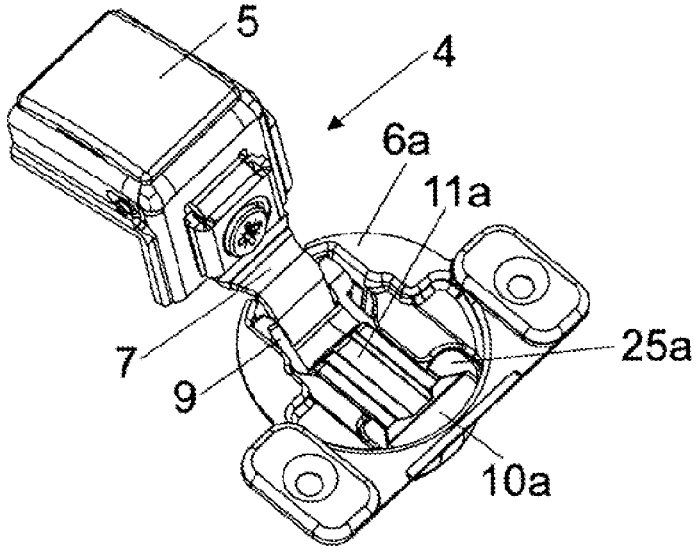

FIG. 14b shows the damping device 10 when subsequently fitted into the hinge cup 6a. The housing 10a of the damping device 10 has an arcuate peripheral edge adapted to the inside shape of the hinge cup 6a. The housing 10a of the damping device 10 has at least one preferably shoulder-shaped abutment 25a which is additionally supported at an inside wall of the hinge cup 6a so that the housing 10a is held at least partially in positively locking relationship within the hinge cup 6a. Towards the end of the closing movement of the hinge 4 the hinge lever 7 encounters the slider 11a, whereupon it is pushed into the housing 10a and the closing movement of the hinge 4 is thus damped.

Figure 14C:
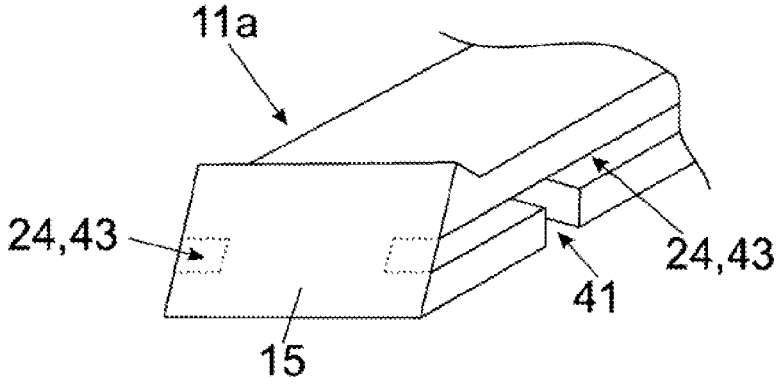

FIG. 14c shows a highly diagrammatic perspective view of a possible embodiment of a slider 11a. The slider 11a is provided with an inclined surface 15 provided for contact with the hinge lever 7. The first fixing means 24 arranged on the slider 11a include at least one guide groove 43, extending in the longitudinal direction of slider, for the second fixing means 23 arranged on the hinge cup 6a, preferably for the fixing projection 14 arranged in the hinge cup 6a (see FIG. 14a) for fixing the slider 11a. In addition there is an introduction opening 41, through which the fixing projection 14 can be arranged in the guide groove 43. The slider 11a can thus be moved relative to the fixing projection 14 in such a way that the fixing projection 14 can be passed through the introduction opening 41 and positioned in the guide groove 43. In the damping stroke therefore the slider 11a can be displaced relative to the fixing projection 14 mounted in the guide groove 43. To remove the damping device 10 the fixing projection 14 is again threaded through the introduction opening so that the housing 10 can again be moved out of the hinge cup 6a. In the illustrated embodiment the slider 11a has on both longitudinal sides guide grooves 43 provided for receiving two fixing projections 14 disposed in mutually opposite relationship in the hinge cup 6a.

The present invention is not limited to the illustrated embodiments but includes or extends to all variants and technical equivalents which can fall within the scope of the appended claims. The positional references adopted in the description such as for example up, down, lateral and so forth are also related to the directly described and illustrated Figure and are to be appropriately transferred to the new position upon a change in position.

The invention claimed is:

1. A furniture hinge comprising:

a fitment portion to be fixed to a furniture part[, said fitment portion having a hinge arm];

a hinge cup pivotally connected relative to said fitment portion, said hinge cup having an opening at one end of said hinge cup, an opposite end of said hinge cup in a depth direction of said hinge cup being closed by a bottom surface of said hinge cup, and said hinge cup having an interior which extends from said opening of said hinge cup to said bottom surface of said hinge cup in the depth direction of said hinge cup; and a damping device for damping a relative movement between said hinge cup and said fitment portion, wherein said damping device has a housing and first fixing means, and a side wall of said hinge cup has second fixing means, wherein said [hinge arm of said] fitment portion is hingedly connected to said hinge cup by way of at least one hinge lever *via only one axis of rotation*, wherein said housing of said damping device is arranged substantially completely within said hinge cup and is releasably fixed to said hinge cup by releasable engagement of said first fixing means of said housing and said second fixing means of said hinge cup so as to be removable from and insertable into said hinge cup through said opening of said hinge cup in a direction perpendicular to said bottom surface of said hinge cup,

[and] wherein said damping device is a fluid damper, wherein said first or second fixing means include at least one movable or mobile arresting element, by which said housing of said damping device is releasably fixed relative to said hinge cup, wherein the other of said first and second fixing means comprises an opening portion or a latching edge, [and]

wherein said arresting element is of a resilient nature, and wherein the engagement between said first and second fixing means is releasable by pressure against the resilient action of said arresting element*, and*

*wherein said damping device is configured to be separate from and mounted independent of said at least one hinge lever hingedly connecting said fitment portion to said hinge cup such that said damping device is freely removable from said hinge cup and freely insertable into said hinge cup without interference from said at least one hinge lever.*

2. The furniture hinge according to claim 1, wherein said housing is insertable into said hinge cup without as tool.

3. The furniture hinge according to claim 2, wherein said first and second fixing means jointly provide a self-latching connection.

4. The furniture hinge according to claim 1, wherein said first fixing means comprises said arresting element, said arresting element being arranged on said housing of said damping device, and said second fixing means comprises said opening portion or said latching edge of said hinge cup.

5. The furniture hinge according to claim 1, wherein said second fixing means comprises said arresting element and said first fixing means comprises said opening or said latching edge arranged on said housing of said damping device.

6. The furniture hinge according to claim 1, wherein said housing has a peripheral surface, aft least a portion of said peripheral surface having a shape which corresponds to an inner shape of said hinge cup.

7. The furniture hinge according to claim 1, wherein said damping device has a first and a second fluid chamber which are filled with damping fluid and to are connected together by way of a passage.

8. The furniture hinge according to claim 7, further comprising a piston which is engageable in said first fluid chamber so as to change a volume of said first fluid chamber, and wherein arranged in said second fluid chamber is a device which is deformable or movable by a flow of damping fluid into and out of said second fluid chamber for changing a volume of said second fluid chamber.

9. The furniture hinge according to claim 8, wherein said device has a deformable material portion arranged in said second fluid chamber or a piston displaceable in said second fluid chamber.

10. The furniture hinge according to claim 1, wherein said damping device has a first piston with a linear damping stroke and at least one second piston with a linear damping stroke, wherein a direction of the linear damping stroke of said first piston extends substantially parallel or transversely relative to a direction of the linear damping stroke of said second piston.

11. The furniture hinge according to claim 10, wherein the direction of the linear damping stroke of said first piston relative to the direction of the linear damping stroke of said second piston includes an angle, wherein the angle is between 70° and 110°.

12. The furniture hinge according to claim 10, wherein the direction of the linear damping stroke of said first piston relative to the linear damping stroke of said second piston extends at a [fight] *right* angle.

13. The furniture hinge according to claim 1, wherein said damping device has an actuating element which is arranged so as to be acted upon by said fitment portion or by said hinge lever during the hinge movement, said hinge lever being mounted movably between said fitment portion and said hinge cup.

14. The furniture hinge according to claim 13, wherein at least one piston is integrally connected to said actuating element.

15. The furniture hinge according to claim 13, wherein said actuating element of said damping device has a slider which is linearly displaceable relative to said housing of said damping device.

16. The furniture hinge according to claim 15, wherein said slider has an inclined surface which is arranged so as to be acted upon by said fitment portion or said hinge lever in a damping stroke whereby said slider is movable relative to said hinge cup.

17. The furniture hinge according to claim 15, wherein said slider has a slot, by which said slider is displaceable relative to a fixing projection arranged on said hinge cup.

18. The furniture hinge according to claim 1, wherein said housing of said damping device has at least one shoulder-shaped abutment which additionally bears against an inside wall of said hinge cup.

19. An article of furniture having at least one movable furniture part supported movably by way of at least one furniture hinge according to claim 1.

[20. The furniture hinge according to claim 1, wherein said housing is removable from said hinge cup without a tool.]

*21. A furniture hinge comprising:*

*a fitment portion to be fixed to a furniture part;*

*a hinge cup pivotally connected relative to said fitment portion, said hinge cup having an opening at one end of said hinge cup, an opposite end of said hinge cup in a depth direction of said hinge cup being closed by a bottom surface of said hinge cup, and said hinge cup having an interior which extends from said opening of said hinge cup to said bottom surface of said hinge cup in the depth direction of said hinge cup; and*

*a damping device for damping a relative movement between said hinge cup and said fitment portion,*

*wherein said hinge cup has a first end wall and an entirely closed second end wall opposite said first end wall,*

*wherein said damping device has a housing and first fixing means, and a side wall of said hinge cup has second fixing means,*

*wherein said fitment portion is hingedly connected to said hinge cup at said first end wall by way of at least one hinge lever,*

*wherein said housing of said damping device is arranged substantially completely within said hinge cup and is releasably fixed to said hinge cup by releasable engagement of said first fixing means of said housing and said*

*second fixing means of said hinge cup so as to be removable from and insertable into said hinge cup through said opening of said hinge cup in a direction perpendicular to said bottom surface of said hinge cup,*

*wherein said damping device is a fluid damper,*

*wherein said first or second fixing means include at least one movable or mobile arresting element, by which said housing of said damping device is releasably fixed relative to said hinge cup,*

*wherein the other of said first and second fixing means comprises an opening portion or a latching edge,*

*wherein said arresting element is of a resilient nature, and wherein the engagement between said first and second fixing means is releasable by pressure against the resilient action of said arresting element, and*

*wherein said damping device is configured to be separate from and mounted independent of said at least one hinge lever hingedly connecting said fitment portion to said hinge cup such that said damping device is freely removable from said hinge cup and freely insertable into said hinge cup without interference from said at least one hinge lever.*

*22. A furniture hinge comprising:*

*a fitment portion to be fixed to a furniture part;*

*a hinge cup pivotally connected relative to said fitment portion, said hinge cup having an opening at one end of said hinge cup, an opposite end of said hinge cup in a depth direction of said hinge cup being closed by a bottom surface of said hinge cup, and said hinge cup having an interior which extends from said opening of said hinge cup to said bottom surface of said hinge cup in the depth direction of said hinge cup; and*

*a damping device for damping a relative movement between said hinge cup and said fitment portion,*

*wherein said hinge cup has a first end wall and an arcuate-shaped second end wall opposite said first end wall,*

*wherein said damping device has a housing and first fixing means, and a side wall of said hinge cup has second fixing means,*

*wherein said fitment portion is hingedly connected to said hinge cup at said first end wall by way of at least one hinge lever,*

*wherein said housing of said damping device is arranged substantially completely within said hinge cup and is releasably fixed to said hinge cup by releasable engagement of said first fixing means of said housing and said second fixing means of said hinge cup so as to be removable from and insertable into said hinge cup through said opening of said hinge cup in a direction perpendicular to said bottom surface of said hinge cup,*

*wherein said damping device is a fluid damper, wherein said first or second fixing means include at least one movable or mobile arresting element, by which said housing of said damping device is releasably fixed relative to said hinge cup,*

*wherein the other of said first and second fixing means comprises an opening portion or a latching edge,*

*wherein said arresting element is of a resilient nature, and wherein the engagement between said first and second fixing means is releasable by pressure against the resilient action of said arresting element, and*

*wherein said damping device is configured to be separate from and mounted independent of said at least one hinge lever hingedly connecting said fitment portion to said hinge cup such that said damping device is freely removable from said hinge cup and freely insertable into said hinge cup without interference from said at least one hinge lever.*

*23. The furniture hinge according to claim 22, wherein said housing of said damping device has an arcuate-shaped wall abutting against said arcuate-shaped second end wall of said hinge cup.*

*24. The furniture hinge according to claim 22, wherein said at least one hinge lever is adjustably mounted to said fitment portion.*

*25. A furniture hinge comprising:*

*a fitment portion to be fixed to a furniture part;*

*a hinge cup pivotally connected relative to said fitment portion, said hinge cup having an opening at one end of said hinge cup, an opposite end of said hinge cup in a depth direction of said hinge cup being closed by a bottom surface of said hinge cup, and said hinge cup having an interior which extends from said opening of said hinge cup to said bottom surface of said hinge cup in the depth direction of said hinge cup;*

*a damping device for damping a relative movement between said hinge cup and said fitment portion; and*

*a spring device mounted to said hinge cup for holding said fitment portion and said hinge cup in at least one of an open position and a closed position,*

*wherein said damping device has a housing and first fixing means, and a side wall of said hinge cup has second fixing means,*

*wherein said fitment portion is hingedly connected to said hinge cup by way of at least one hinge lever,*

*wherein said housing of said damping device is arranged substantially completely within said hinge cup and is releasably fixed to said hinge cup by releasable engagement of said first fixing means of said housing and said second fixing means of said hinge cup so as to be removable from and insertable into said hinge cup through said opening of said hinge cup in a direction perpendicular to said bottom surface of said hinge cup,*

*wherein said damping device is a fluid damper,*

*wherein said first or second fixing means include at least one movable or mobile arresting element, by which said housing of said damping device is releasably fixed relative to said hinge cup,*

*wherein the other of said first and second fixing means comprises an opening portion or a latching edge,*

*wherein said arresting element is of a resilient nature, and wherein the engagement between said first and second fixing means is releasable by pressure against the resilient action of said arresting element, and*

*wherein said damping device is configured to be separate from and mounted independent of said at least one hinge lever hingedly connecting said fitment portion to said hinge cup such that said damping device is freely removable from said hinge cup and freely insertable into said hinge cup without interference from said at least one hinge lever.*

*26. The furniture hinge according to claim 25, wherein said spring device comprises a pair of coil springs arranged on opposite sides of said at least one hinge lever.*

*27. A furniture hinge comprising:*

*a fitment portion to be fixed to a furniture part;*

*a hinge cup pivotally connected relative to said fitment portion, said hinge cup having an opening at one end of said hinge cup, an opposite end of said hinge cup in a depth direction of said hinge cup being closed by a bottom surface of said hinge cup, and said hinge cup having an interior which extends from said opening of*

*said hinge cup to said bottom surface of said hinge cup in the depth direction of said hinge cup; and*

*a damping device for damping a relative movement between said hinge cup and said fitment portion, said damping device comprising a fluid damper having a fluid chamber containing a liquid damping medium,*

*wherein said damping device has a housing and first fixing means, and a side wall of said hinge cup has second fixing means,*

*wherein said fitment portion is hingedly connected to said hinge cup by way of at least one hinge lever,*

*wherein said housing of said damping device is arranged substantially completely within said hinge cup and is releasably fixed to said hinge cup by releasable engagement of said first fixing means of said housing and said second fixing means of said hinge cup so as to be removable from and insertable into said hinge cup through said opening of said hinge cup in a direction perpendicular to said bottom surface of said hinge cup,*

*wherein said first or second fixing means include at least one movable or mobile arresting element, by which said housing of said damping device is releasably fixed relative to said hinge cup,*

*wherein the other of said first and second fixing means comprises an opening portion or a latching edge,*

*wherein said arresting element is of a resilient nature, and wherein the engagement between said first and second fixing means is releasable by pressure against the resilient action of said arresting element, and*

*wherein said damping device is configured to be separate from and mounted independent of said at least one hinge lever hingedly connecting said fitment portion to said hinge cup such that said damping device is freely removable from said hinge cup and freely insertable into said hinge cup without interference from said at least one hinge lever.*

*28. A furniture hinge comprising:*

*a fitment portion to be fixed to a furniture part, said fitment portion having a base plate and at least one leg extending perpendicularly from said base plate of said fitment portion;*

*a hinge cup pivotally connected relative to said fitment portion, said hinge cup having an opening at one end of said hinge cup, an opposite end of said hinge cup in a depth direction of said hinge cup being closed by a bottom surface of said hinge cup, and said hinge cup having an interior which extends from said opening of said hinge cup to said bottom surface of said hinge cup in the depth direction of said hinge cup; and*

*a damping device for damping a relative movement between said hinge cup and said fitment portion,*

*wherein said damping device has a housing and first fixing means, and a side wall of said hinge cup has second fixing means,*

*wherein said base plate of said fitment portion is hingedly connected to said hinge cup by way of at least one hinge lever,*

*wherein said housing of said damping device is arranged substantially completely within said hinge cup and is releasably fixed to said hinge cup by releasable engagement of said first fixing means of said housing and said second fixing means of said hinge cup so as to be removable from and insertable into said hinge cup through said opening of said hinge cup in a direction perpendicular to said bottom surface of said hinge cup,*

*wherein said damping device is a fluid damper,*

*wherein said first or second fixing means include at least one movable or mobile arresting element, by which said housing of said damping device is releasably fixed relative to said hinge cup,*

*wherein the other of said first and second fixing means comprises an opening portion or a latching edge,*

*wherein said arresting element is of a resilient nature, and wherein the engagement between said first and second fixing means is releasable by pressure against the resilient action of said arresting element, and*

*wherein said damping device is configured to be separate from and mounted independent of said at least one hinge lever hingedly connecting said fitment portion to said hinge cup such that said damping device is freely removable from said hinge cup and freely insertable into said hinge cup without interference from said at least one hinge lever.*

*29. The furniture hinge according to claim 28, wherein said fitment portion is L-shaped.*

*30. The furniture hinge according to claim 28, wherein said fitment portion is U-shaped.*

* * * * *